Patented Aug. 15, 1950

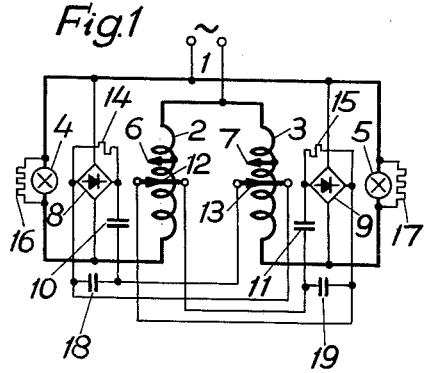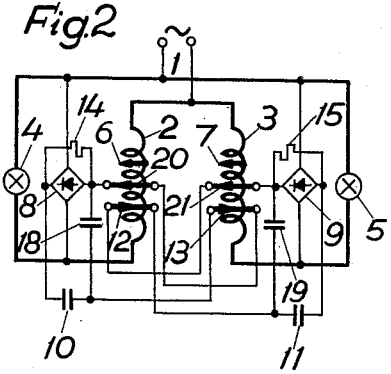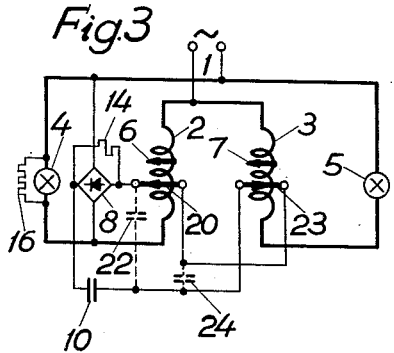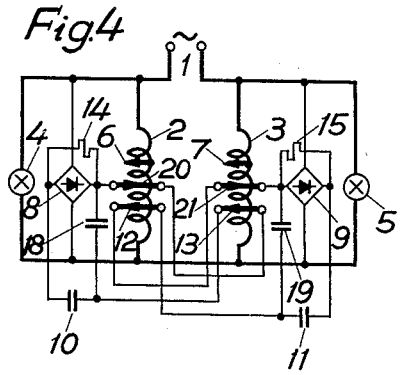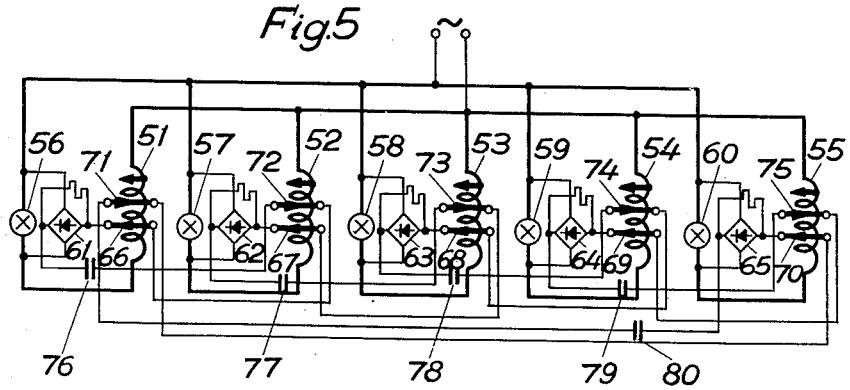

2,518,953

UNITED STATES PATENT OFFICE 2,518,953

MEANS FOR GENERATING LOW-FREQUENCY ELECTRICAL OSCILLATIONS

Harald M. Sörensen, Vasteras, and Björn Stephensen, Ludvika, Sweden, assignors to Allmanna Svenska Elektriska Aktiebolaget, Vasteras, Sweden, a Swedish corporation Application September 14, 1948, Serial No. 49,154
In Sweden October 4, 1947

7 Claims. (Cl. 323—76)

1

It has been earlier proposed to generate low frequency electrical oscillations, for instance for intermittent light production, by means of a direct current saturable reactor—hereinafter shortly referred to as a transductor—which is provided with a winding fed through members causing resonance oscillations from a rectifier connected in the main circuit of the transductor. According to one proposal, the transductor is also provided with a directly fed self-magnetisation, whereby the action is essentially improved.

It has now been found, that the aforesaid idea could be further developed for generating low frequency oscillations in two or more circuits in such manner that they succeed each other in a certain rhythm, for instance so that one lamp out of a plurality burns while the rest is extinguished. Such a system of circuits may for instance be employed for certain traffic signalling, for advertising or for entertainment purposes. According to the present invention, two or more transductors fed through resonance members are employed for this purpose and fed in such manner, that the magnetisation of one transductor is raised while that of one or more others is lowered and vice versa.

Some forms of the invention are diagrammatically illustrated in Figs. 1–5 of the accompanying drawing.

In Fig. 1, two parallel circuits are connected to an alternating current source 1 of a frequency considerably higher than the frequency of the intended oscillations, preferably of ordinary commercial frequency, each circuit containing in series a transductor 2, 3 respectively and a load 4, 5 respectively, for instance a lamp. The transductors are provided with directly fed self-magnetisation, preferably with a so-called internal self-magnetisation of the kind illustrated in Figs. 2 and 3 of the pending U. S. Patent application No. 712,420 and here conventionally indicated by the arrows 6, 7 respectively, which at the same time symbolize a certain sense of action of the self-magnetisation. In parallel to each load, there is in Fig. 1 connected a rectifier 8, 9 respectively. The rectifier 8, which is parallel to the load 4, feeds a conventionally indicated magnetizing winding 13 of the transductor 3 across a condenser 10, the magnetizing direction of said winding being opposite to that of the self-magnetisation of the transductor. The rectifier 9, which is parallel to the load 5, feeds a magnetizing winding 12 of the transductor 2 across a condenser 11, said winding opposing the action of the self-magnetisation of the said transduc-

2 tor. In parallel to the rectifiers 8 and 9, there may be connected leakage resistors 14, 15 respectively, which accelerate the discharging of the condensers after they have been charged from the rectifiers. The load objects 4, 5 may also be provided with parallel resistors 16, 17 which serve to admit the current for instance if a lamp should burn out and thereby to enable the other lamp to continue its function. Finally, condensers 19, 18 may be connected in parallel to the magnetizing windings 12, 13 respectively and may have equal capacities to the condensers 10, 11, whereby, as it has been found, the oscillations will obtain a character better suited for intermittent light.

The arrangement described operates substantially in the following manner. When the rectifier feeds the windings 13 in charging the condenser 10, the magnetisation of the transductor 3 is lowered so that it will only admit a small current through the lamp 5, insufficient for causing the lamp to emit light. Simultaneously, the condenser 11 charged beforehand discharges through the leakage resistance 15 and forces a current through the winding 12 opposite to the arrow, said current being comparatively weak but still sufficient, in cooperation with the self-magnetisation, to magnetize the transductor 2 to full current so as to cause the lamp 4 to emit light. After the condenser 10 has been charged and the condenser 11 discharged, the opposite conditions will prevail, the lamp 5 beginning to emit light and the lamp 4 being extinguished.

The frequency of the oscillations thus obtained is determined by the oscillation elements consisting of the condenser 11 and the inductance of the winding 12, and is thus entirely independent of the frequency of the alternating current.

An improved manner of operation may be obtained by means of the connection shown in Fig. 2, when the circuit through the condenser 10 or 11 contains not only a negative magnetizing winding on the opposite transductor but also a positively magnetizing winding 20, 21 on the transductor feeding the said condenser across a rectifier. Each transductor with its load circuit will then form a self-oscillating unit, even if the other transductor should cease oscillating for instance on account of an interruption in the lamp. The parallel resistances 16, 17 of the lamps shown for instance in Fig. 1 may therefore be omitted in Fig. 2. The condensers 18, 19 are here connected in parallel to both of the two series-connected magnetizing windings.

In Fig. 3 the alternating current windings 2, 3 of the transductors and the load objects 4, 5 are connected in series with each other and in parallel to the alternating current terminals 1, as in Figs. 1 and 2. Only one load object 4 is, however, connected in parallel to a rectifier 8, which feeds across a condenser a positively magnetizing winding 20 of its own transductor 2 as well as a negatively magnetizing winding 23 of the other transductor 3. The load circuit of the transductor 2 becomes thus self-oscillatory and causes the transductor 3 to oscillate in phase opposition thereto. The flash-light character will then as a rule not be as pronounced as by the connection according to Fig. 2, but it can be further improved by means of the auxiliary condensers 22, 24 shown in dotted lines, one of which is parallel to both of the series-connected magnetizing windings 20, 23 and the other parallel to only the last-mentioned winding.

The load 4 has a parallel resistance 16, by the aid of which the corresponding circuit continues to oscillate even if an interruption takes place in 4.

In Fig. 4, the two transductors are connected in series to the alternating current terminals 1, while each transductor is connected in parallel to a load as a lamp 4, 5. Each lamp will then emit light when the transductor has a low magnetisation and will be extinguished when the transductor has a high magnetisation. The rectifiers 8, 9 are connected in parallel to the loads 4, 5, and the rectified currents from each of them, which oscillates in phase opposition to the transductor current, will act negatively magnetizing on one transductor and positively magnetizing on the other. The result will be substantially analogous to that obtained according to Fig. 2. Auxiliary condensers 18, 19 are also here connected in parallel to the groups of series-connected magnetizing windings.

In Fig. 5, five transductors 51–55 with corresponding load lamps 56–60 and rectifiers 61–65 in parallel to these are connected in parallel to the alternating current terminals 1. The direct current from each rectifier positively magnetizes its own transductor by means of a winding 66–70 and negatively magnetizes the next transductor in one direction by means of a winding 71–75. The whole is cyclically arranged, so that the current from the last rectifier traverses the negatively magnetizing winding 71 of the first transductor. The lamps are in this connection generally lit twice during the course of the whole series of five units.

We claim as our invention:

1. Means for generating low frequency electrical oscillations, comprising a source of alternating current of a considerably higher frequency than said oscillations, a load element and a transductor connected in series thereto, a self-magnetizing winding for said transductor, members capable of sustaining low frequency electrical oscillations, means feeding the said winding through said members, at least one additional transductor connected to an alternating current source in series with a load, and means whereby one of said transductors is highly magnetized when the other has a low magnetization.

2. Means according to claim 1, comprising a rectifier, and means whereby a member capable of sustaining oscillations is arranged to be fed from one of the transductors across said rectifier and feeds a magnetizing winding of another transductor in a sense contrary to a self-magnetization thereof.

3. Means according to claim 1, comprising windings on both transductors magnetizing in both senses and means feeding said windings by currents traversing the said members capable of sustaining oscillation, and transductors and rectifiers acting to feed said currents.

4. Means according to claim 1, comprising a circuit containing said members capable of sustaining oscillation and feeding only one of said transductors, and means for magnetizing the other transductor under the influence of the first-mentioned transductor.

5. Means according to claim 1, comprising an alternating current source feeding in parallel both said transductors, and load objects connected in series therewith.

6. Means according to claim 1, comprising an alternating current source feeding in series both said transductors, and load objects connected in parallel therewith.

7. Means according to claim 1, comprising a self-magnetizing means for the said transductors independent of the said members capable of sustaining oscillations.

HARALD M. SÖRENSEN.
BJÖRN STEPHENSEN.

REFERENCES CITED

The following references are of record in the file of this patent:

UNITED STATES PATENTS

| Number | Name | Date |
|---|---|---|
| 1,921,787 | Suits | Aug. 8, 1933 |
| 1,921,789 | Suits | Aug. 8, 1933 |
| 1,925,011 | Suits | Aug. 29, 1933 |
| 1,946,297 | Suits | Feb. 6, 1934 |

FOREIGN PATENTS

| Number | Country | Date |
|---|---|---|
| 431,460 | Great Britain | Oct. 2, 1933 |